United States Patent
Minowa (10) Patent No.: US 8,934,613 B2
(45) Date of Patent: Jan. 13, 2015

(54) DATA PROCESSING DEVICE AND NON-TRANSITORY COMPUTER READABLE MEDIUM

(71) Applicant: Fuji Xerox Co., Ltd., Tokyo (JP)

(72) Inventor: Kazuhiko Minowa, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/932,554

(22) Filed: Jul. 1, 2013

(65) Prior Publication Data
US 2014/0286482 A1 Sep. 25, 2014

(30) Foreign Application Priority Data
Mar. 25, 2013 (JP) .................. 2013-062684

(51) Int. Cl.
*H04M 11/00* (2006.01)
*H04N 1/00* (2006.01)
(52) U.S. Cl.
CPC ....... *H04N 1/00302* (2013.01); *H04N 1/00331* (2013.01)
USPC ..................... 379/100.13; 709/206
(58) Field of Classification Search
None
See application file for complete search history.

(56) References Cited

U.S. PATENT DOCUMENTS

| 6,618,165 | B1 * | 9/2003 | Sehgal ........................ 358/1.15 |
| 8,618,165 | B2 * | 12/2013 | Bryhn et al. .................. 514/549 |
| 2006/0209333 | A1 * | 9/2006 | Takida .......................... 358/1.15 |
| 2007/0071190 | A1 * | 3/2007 | Denpo ........................ 379/93.09 |
| 2011/0002005 | A1 * | 1/2011 | Ashmore .................... 358/1.15 |
| 2011/0134478 | A1 * | 6/2011 | Roger .......................... 358/1.15 |
| 2011/0213851 | A1 * | 9/2011 | Sugawara et al. ............. 709/206 |
| 2011/0296511 | A1 * | 12/2011 | Gajadevasangary et al. ..... 726/7 |
| 2012/0320422 | A1 * | 12/2012 | Couchman ................... 358/1.15 |
| 2013/0278960 | A1 * | 10/2013 | Nishiyama .................... 358/1.14 |
| 2014/0043656 | A1 * | 2/2014 | Couchman et al. ........... 358/434 |

FOREIGN PATENT DOCUMENTS

| JP | A-06-338978 | 12/1994 |
| JP | A-09-247336 | 9/1997 |

* cited by examiner

*Primary Examiner* — Maria El-Zoobi
(74) *Attorney, Agent, or Firm* — Oliff PLC (57) ABSTRACT

A data processing device includes: a receiving unit that receives data; a transfer processing unit that specifies a destination of the data received by the receiving unit, and in accordance with an information processing device of the specified destination, determines a data form of the data to be transferred to the information processing device; a data conversion unit that converts the data received by the receiving unit into the data form determined by the transfer processing unit; and a sending unit that sends the data converted by the data conversion unit, via a circuit capable of connecting to the information processing device of the destination specified by the transfer processing unit, to the information processing device.

13 Claims, 7 Drawing Sheets

| DESTINATION | ACCESS DESTINATION INFORMATION | ACCESSIBLE TIME PERIOD |
|---|---|---|
| DESTINATION A | 090-xxxx-xxxx | MONDAY THROUGH FRIDAY : TIME PERIOD 1 |
| DESTINATION B | oooo@xxx.co.jp | MONDAY THROUGH FRIDAY : TIME PERIOD 2 |
| DESTINATION C | 045-xxx-xxxx | SATURDAY AND SUNDAY : ALL DAY |
| DESTINATION D | oooo@xxxx.com | MONDAY THROUGH FRIDAY : TIME PERIOD 3 |

FIG. 4

| DESTINATION | ACCESS DESTINATION INFORMATION | SOURCE |
|---|---|---|
| DESTINATION A | 090-xxxx-xxxx | 03-xxxx-xxxx |
| DESTINATION B | oooo@xxx.co.jp | 03-xxxx-xxxx |
| DESTINATION C | 045-xxx-xxxx | +1-65-xxx-xxxx |
| DESTINATION D | oooo@xxxx.com | 045-xxx-xxxx |

FIG. 5

| DESTINATION | DATA FORM |
|---|---|
| DESTINATION A | JPEG |
| DESTINATION B | PDF |
| DESTINATION C | FAX |
| DESTINATION D | PDF |

FIG. 7

DATA PROCESSING DEVICE AND NON-TRANSITORY COMPUTER READABLE MEDIUM

CROSS REFERENCE TO RELATED APPLICATIONS

This application is based on and claims priority under 35 USC §119 from Japanese Patent Application No. 2013-062684 filed Mar. 25, 2013, incorporated herein by reference in its entirety.

BACKGROUND

1. Technical Field

The present invention relates to data processing device and a non-transitory computer readable medium.

2. Related Art

There are known techniques that enable a terminal device, which is not a facsimile device, to receive data sent from a facsimile device and display the data.

SUMMARY

According to an aspect of the present invention, there is provided a data processing device including: a receiving unit that receives data; a transfer processing unit that specifies a destination of the data received by the receiving unit, and in accordance with an information processing device of the specified destination, determines a data form of the data to be transferred to the information processing device; a data conversion unit that converts the data received by the receiving unit into the data form determined by the transfer processing unit; and a sending unit that sends the data converted by the data conversion unit, via a circuit capable of connecting to the information processing device of the destination specified by the transfer processing unit, to the information processing device.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail with reference to the attached drawings.

<System Configuration>

Figure 1:
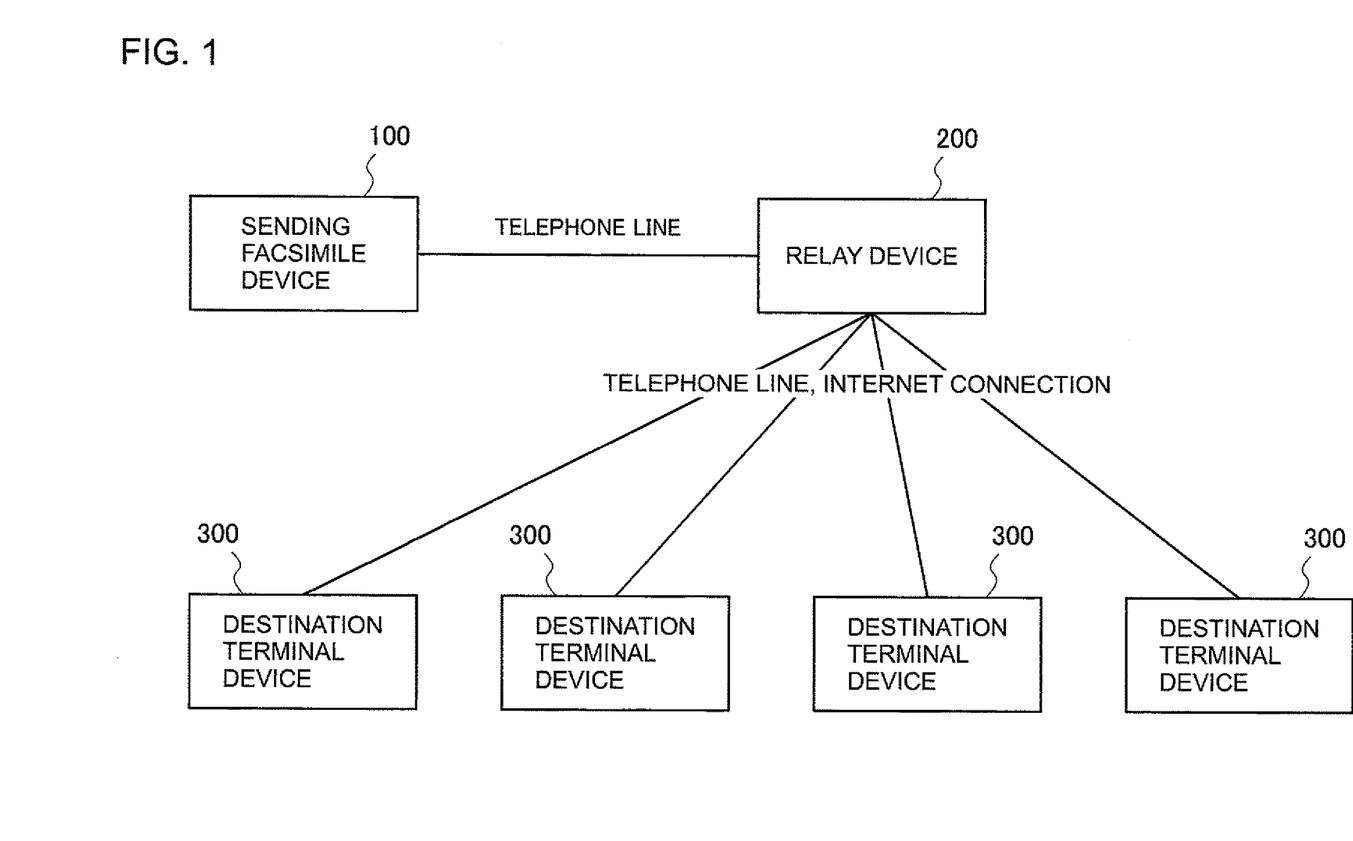
FIG. 1 is a diagram showing a configuration example of a data processing system to which an exemplary embodiment is applied.

FIG. 1 is a diagram showing a configuration example of a data processing system to which an exemplary embodiment is applied.

The data processing system shown in FIG. 1 is configured to include a sending facsimile device 100, a relay device 200 and destination terminal devices 300. The sending facsimile device 100 and the relay device 200 are connected to each other via a telephone line. In the specific example shown in FIG. 1, only one sending facsimile device 100 is indicated; however, in an actual system configuration, the relay device 200 is connected to plural sending facsimile devices 100. Moreover, the relay device 200 and the destination terminal devices 300 are connected to each other via various kinds of circuits, such as a telephone line, the Internet connection or the like in accordance with kinds of the destination terminal devices 300.

The sending facsimile device 100 is a common facsimile device that converts image data and sends the data via a telephone line. Image data, which is an object of sending, may be obtained by reading with an image scanner (an image reading device) or may be obtained by receiving from an external device. The sending facsimile device 100 encodes and compresses the obtained image data. As a method of encoding and compressing data, in general, an MH (Modified Hoffman) method, an MMR (Modified Modified READ) method or the like is used. It should be noted that, with respect to the sending facsimile device 100, only a sending function thereof is referred to with attention given to a role played in the system of the exemplary embodiment; however, the sending facsimile device 100 may have a receiving function or an outputting function to output a received image (an image formation function) as functions of a common facsimile device.

The relay device 200 is an information processing device that receives data sent from the sending facsimile device 100 and transfers the data to the destination terminal devices 300 that have been set in advance. In other words, in relationship with the sending facsimile device 100, the relay device 200 functions as a receiving facsimile device. Moreover, in relationship with the destination terminal devices 300, the relay device 200 functions as a sending terminal device.

The destination terminal device 300 is an information processing device that receives the data sent from the relay device 200 via a telephone line, a communication circuit or the like. Specifically, the destination terminal device 300 is, for example, a personal computer, a personal digital assistant, a mobile phone, a facsimile device or the like. The received data is displayed, for example, on a display device (such as a liquid crystal display) by a display function of the destination terminal device 300. Moreover, in a case where the destination terminal device 300 has a print and output function (in a case where the destination terminal device 300 is a facsimile device or is connected to a printer), the received data may be printed and outputted.

<Functional Configuration of Relay Device>

Figure 2:
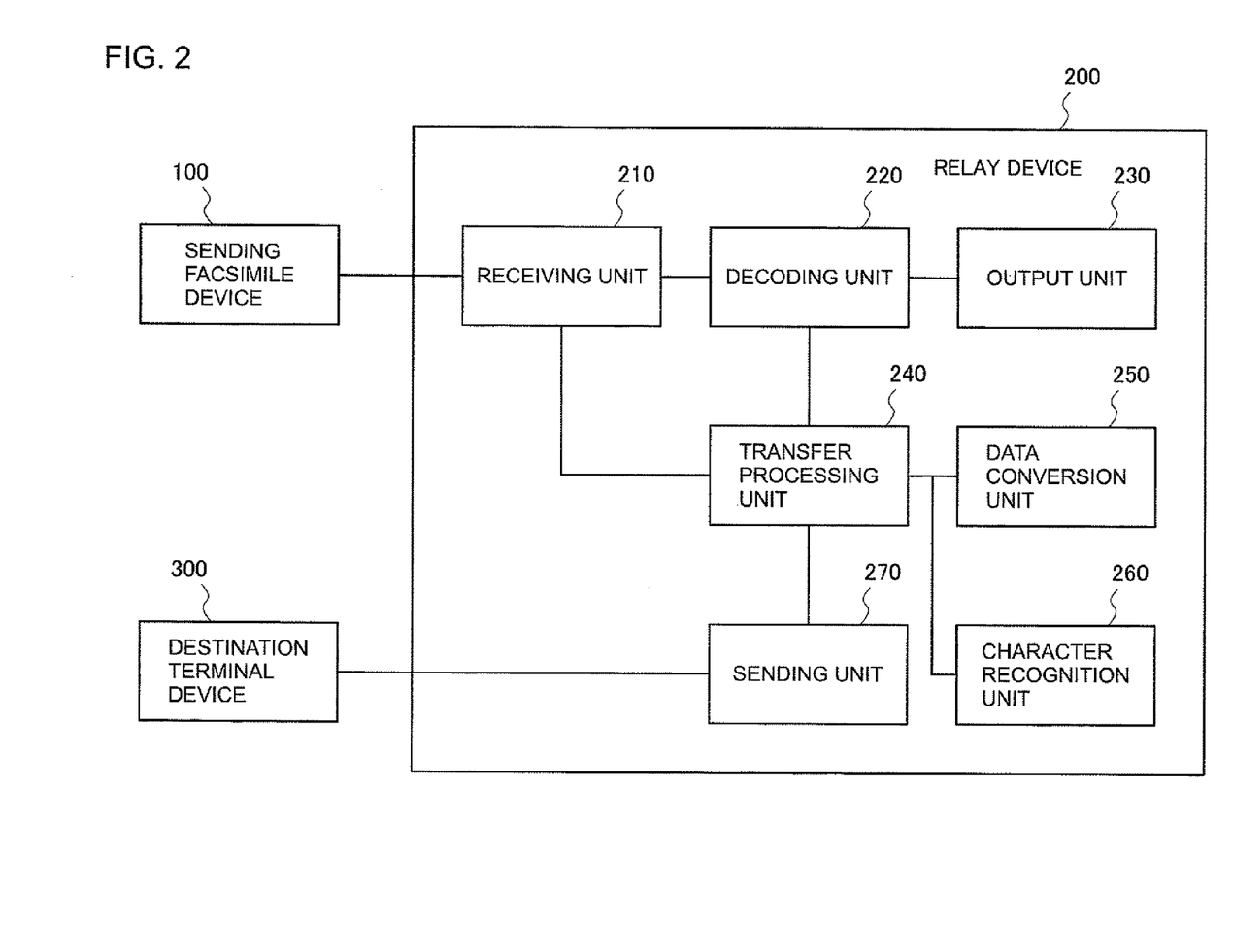
FIG. 2 is a diagram showing a functional configuration example of a relay device.

FIG. 2 is a diagram showing a functional configuration example of the relay device 200.

As shown in FIG. 2, the relay device 200 includes: a receiving unit 210; a decoding unit 220; an output unit 230; a transfer processing unit 240; a data conversion unit 250; a character recognition unit 260 and a sending unit 270.

The receiving unit 210 receives the data sent from the sending facsimile device 100 via a telephone line.

The decoding unit 220 decodes the data received by the receiving unit 210 and reconstructs image data. As described above, in facsimile transmission, encoding and compression of data by the MH method or the MMR method is usually performed. Accordingly, the decoding unit 220 performs a decoding process corresponding to these methods.

The output unit 230 outputs the image data reconstructed by the decoding unit 220. Specifically, the output unit 230 includes an image forming section that forms an image on a recording medium, such as a sheet, by use of an image forming material, such as toner or ink, and a transport section that transports the recording medium and outputs the recording medium to the outside of the device after image formation thereon by the image forming section is performed. In the exemplary embodiment, kinds of methods or mechanisms of image formation by the image forming section are not limited.

The transfer processing unit 240 executes a process for transferring the image data received from the sending facsimile device 100 to destination terminal devices 300. Specifically, a destination terminal device 300, which is a destination of the image data to be transferred, is specified based on destination setting information. Then, the transfer processing unit 240 causes the data conversion unit 250 to perform data conversion corresponding to the kind of the specified destination terminal device 300. Thereafter, the transfer processing unit 240 causes the sending unit 270 to send the data converted by the data conversion unit 250. It should be noted that, in a case where the destination terminal device 300 includes a receiving function of a facsimile, the sending unit 270 performs sending by facsimile transmission in some cases. Details of the process for specifying the destination performed by the transfer processing unit 240 will be described later.

The data conversion unit 250 converts the form of the image data to be transferred into a data form applicable to the destination terminal device 300 under the control by the transfer processing unit 240. Specifically, for example, if the destination terminal device 300 is an information terminal device (such as a personal computer or a personal digital assistant) capable of viewing a document file such as a PDF (Portable Document Format) file, the data conversion unit 250 converts the image data into a document file that can be viewed by the destination terminal device 300. Moreover, if the destination terminal device 300 is a mobile phone or the like capable of displaying an image file such as a JPEG (Joint Photographic Experts Group) file, the data conversion unit 250 converts the image data into an image file that can be displayed by the destination terminal device 300.

The character recognition unit 260 performs a character recognition process on the image data to be transferred and generates text data under the control by the transfer processing unit 240. As a method of character recognition in the exemplary embodiment, any of already-existing character recognition techniques is applied. As will be described later, in the exemplary embodiment, when data is transferred to a specific destination terminal device 300, the text data extracted from an image sent by facsimile transmission is also sent with this data. Accordingly, in a case where a document is contained in an image sent by facsimile transmission, it is possible to provide the contents of the document in a form of text data, which is processed at light load compared to an image and is easily managed by an information processing device.

The sending unit 270 sends the data converted by the data conversion unit 250 to the destination terminal device 300 under the control by the transfer processing unit 240. In the case where the text data is generated by the character recognition unit 260, the text data is sent with the data converted by the data conversion unit 250. As a circuit for sending data, a telephone line, a network communication circuit or the like is selected in accordance with the kind of the destination terminal device 300.

In the above-described configuration, the receiving unit 210 is embodied by a receiving function of a common facsimile device using a modem or the like. The decoding unit 220, the transfer processing unit 240, the data conversion unit 250 and the character recognition unit 260 are embodied by, for example, a CPU that perform various kinds of arithmetic processing by executing programs and a memory. The output unit 230 is embodied by an outputting function of a common facsimile device. The sending unit 270 is embodied by a sending function of a common facsimile device using a modem or the like and a network interface to be connected to a network such as the Internet.

<Setting of Destination>

The transfer processing unit 240 of the relay device 200 in the exemplary embodiment receives setting of the destination and retains setting information. The setting information includes at least identifying information of the destination terminal device 300 for specifying the destination and access destination information (connection target information) necessary to make access (data connection) to the destination terminal device 300. As the access destination information, for the destination terminal device 300 that is accessible via a telephone line, a telephone number is registered. On the other hand, for the destination terminal device 300 that is accessible via a network such as the Internet, an address used for specifying the access target in performing data communication on the network (an electronic mail address, an IP address or the like) is registered.

Figure 3:
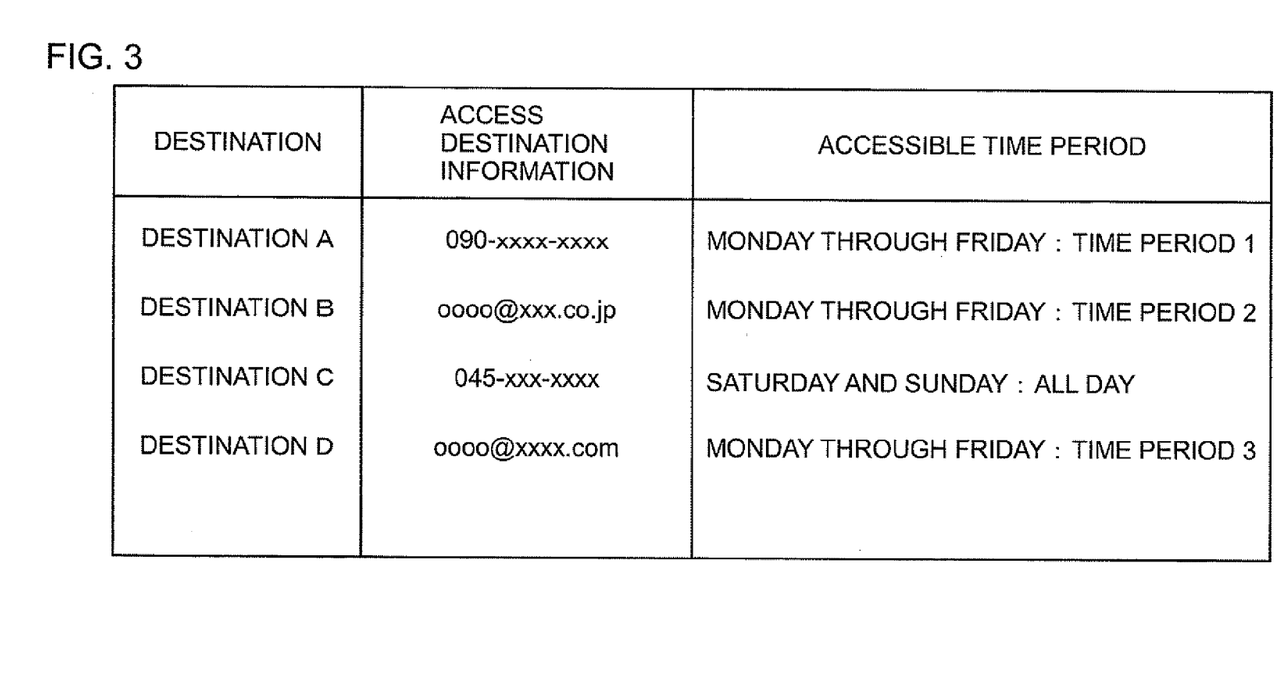
FIG. 3 is a diagram showing an example of setting information of destinations.

FIG. 3 is a diagram showing an example of setting information of the destinations.

In the specific example shown in FIG. 3, four destinations, namely, the destinations A to D are set. Of these, for the destination A and the destination C, telephone numbers are registered as the access destination information. Whereas, for the destination B and the destination D, electronic mail addresses are registered as the access destination information.

Further, in the specific example shown in FIG. 3, an accessible time period is set for each of the destinations A to D. Specifically, the destination A is set to be accessible during the time period 1 on Monday through Friday. Similarly, the destination B is set to be accessible during the time period 2 on Monday through Friday. The destination C is set to be accessible all day on Saturday and Sunday. The destination D is set to be accessible during the time period 3 on Monday through Friday.

Figure 4:
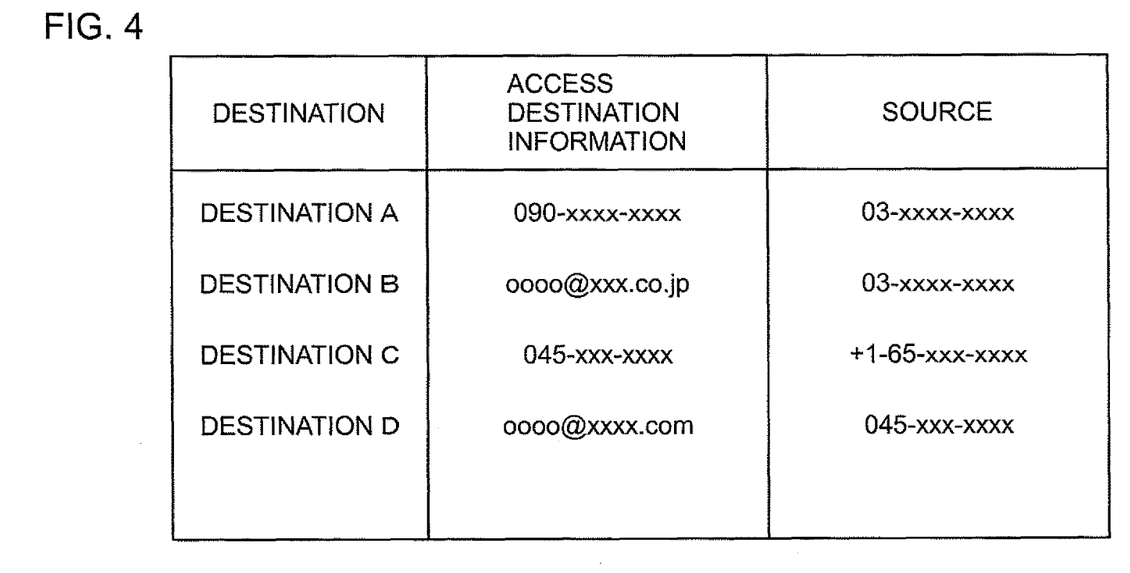
FIG. 4 is a diagram showing another example of the setting information of the destinations.

FIG. 4 is a diagram showing another example of setting information of the destinations.

In the specific example shown in FIG. 4, similar to the specific example in FIG. 3, four destinations, namely, the destinations A to D are set. Moreover, in FIG. 4, a source of the data received by the relay device 200 is registered as a condition for assigning a destination to each of the destinations A to D. In this case, the transfer processing unit 240 assigns a destination to each of the destinations A to D corresponding to the sending facsimile device 100 as a source based on the setting information shown in FIG. 4. Specifying of the sending facsimile device 100 as a source is carried out based on caller identifying information (Caller ID) contained in sending information (that is, received by the receiving unit 210 together with the data) from the sending facsimile device 100. It should be noted that, in addition to the assignment of the destinations A to D based on the sources, it may be possible to set the time period during which each of the destinations A to D is accessible as in the specific example shown in FIG. 3.

It should be noted that the number of destination terminal devices 300 specified as the destination is not limited to only one. Plural destinations may be set, and the data may be converted in accordance with the data form of each of the destination terminal device 300 and transferred. Moreover, destination of the data received from the sending facsimile device 100 can be specified corresponding to the position of the receiver. In a case where a receiver has an information terminal device, such as a mobile phone equipped with a GPS function, the whereabouts of the receiver is specified based on positional information of the GPS system. Then, if the whereabouts of the receiver is a place where the kind of the provided destination terminal device 300 is known, such as a business office or home, the destination terminal device 300 provided at the place is determined as the destination.

<Conversion Control of Data Form>

The relay device 200 of the exemplary embodiment transfers the data received from the sending facsimile device 100 to various destination terminal devices 300 based on the above-described setting information. Accordingly, it is necessary to convert the data form of the data to be transferred (hereinafter, referred to as "transfer data") in conformance with specifications of the destination terminal device 300. For example, a personal computer or a personal digital assistant (including a so-called smartphone) usually has application software capable of displaying a PDF file. Hence, in a case where a personal computer or a personal digital assistant is the destination, the relay device 200 converts the transfer data into a PDF file. Moreover, many of the mobile phones are of specifications capable of displaying image data such as a JPEG file, though being incapable of displaying a PDF file. Therefore, in a case where a mobile phone is the destination, the relay device 200 converts the transfer data into, a JPEG file. The data conversion is performed aiming at the data decoded by the decoding unit 220. It should be noted that conversion may be performed aiming at the data received by the receiving unit 210 (the data prior to being decoded by the decoding unit 220), if possible.

Further, in the exemplary embodiment, as a mode of the above-described data conversion, the character recognition process is performed on received image data to obtain text data. With respect to a mobile phone, there are some cases where characters in an image are too small and difficult to read because of a small-sized display screen. In addition, there are some cases where a mobile phone is provided with a processor of such low performance or such a small memory that the mobile phone cannot display an image. Accordingly, in a case where the destination is a mobile phone, it may also be possible to send text data obtained by a character recognition process together with or instead of a JPEG file converted as described above. Extraction of the text data in this conversion process is performed by the character recognition process, and therefore, the extraction is carried out on the data decoded by the decoding unit 220.

In a case where the destination terminal device 300 is a facsimile device, it is possible to send data by facsimile transmission, and there is no need to convert the transfer data into another data form. Accordingly, the relay device 200 transfers the data received by the receiving unit 210 without decoding.

It should be noted that the data decoded by the decoding unit 220 may be subjected to encoding and compressing by the MH method or the MMR method anew and transferred.

The above-described conversion of the transfer data is performed by the data conversion unit 250 under the control by the transfer processing unit 240. The transfer processing unit 240 determines the data form of the transfer data corresponding to the destination terminal device 300 specified as the destination, and causes the data conversion unit 250 to perform conversion. Determination of the data form of the transfer data is carried out, for example, with reference to a table in which a data form applicable to (displayable by) each of the destination terminal devices 300 is registered (applicable data form table).

Figure 5:
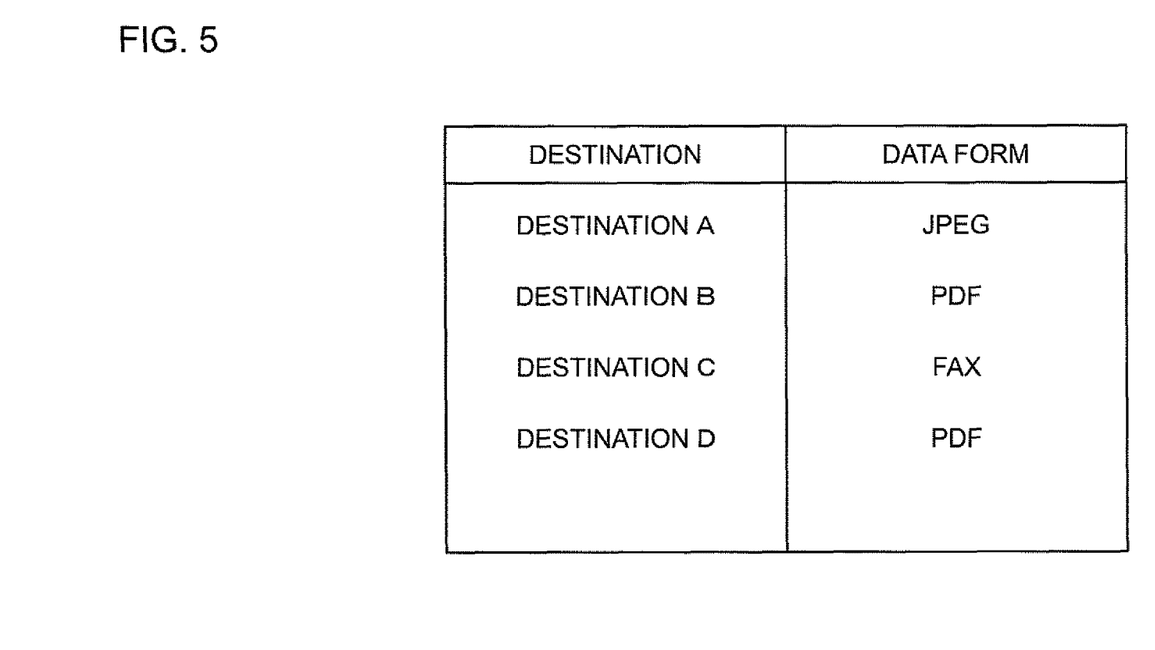
FIG. 5 is a diagram showing an example of an applicable data form table that is referred to for determining a data form of data to be transferred.

FIG. 5 is a diagram showing a specific example of the applicable data form table that is referred to for determining the data form of the transfer data.

In the specific example shown in FIG. 5, an applicable data form is registered for each of four destination terminal devices 300 (destinations A to D). In accordance with the applicable data form table shown in FIG. 5, a JPEG file is applicable to the destination terminal device 300 of the destination A, and a PDF file is applicable to each of the destination terminal devices 300 of the destinations B and D. Moreover, data according to a facsimile transmission format (namely, data encoded and compressed by the MH method or the MMR method, which will be hereinafter referred to as facsimile data. In the figure, indicated as "FAX") is applicable to the destination terminal device 300 of the destination C. Consequently, in the case where the destination of the transfer data is specified as the destination 13 based on the setting information shown in FIG. 3 or FIG. 4, the transfer processing unit 240 determines a PDF file as the data form of the transfer data based on the applicable data form table shown in FIG. 5.

Moreover, the transfer processing unit 240 may determine the data form of the transfer data, not based on the correspondence information (applicable data form table) of each destination terminal device 300 as described above, but based on the access destination information of the destination terminal devices 300. For example, in a case where the access destination information is an e-mail address, it is assumed that the destination terminal device 300 is a personal computer or a personal digital assistant and is capable of displaying a PDF file. Therefore, the transfer processing unit 240 determines a PDF file as the transfer data.

Further, in a case where the access destination information is a phone number, it is learned that the destination terminal device 300 is equipment connected via a telephone line, such as a facsimile device or a mobile phone. Here, based on a configuration of the phone number, it is possible to determine whether the destination terminal device 300 is a fixed-line telephone (a so-called land-line phone) or a mobile phone. For example, in Japan, a phone number that begins with a specific area code, such as "080" or "090" is assigned to a mobile phone. In other countries, similarly, it is also common that discrimination between the fixed-line telephone and the mobile phone based on the phone number is possible. Accordingly, in the exemplary embodiment, in a case where a destination terminal device 300 is connected to a telephone line as a fixed-line telephone, the destination terminal device 300 is regarded as a facsimile device.

After specifying a destination terminal device 300 on a telephone line as described above, if the destination terminal device 300 is a facsimile device, the transfer processing unit 240 does not perform data conversion because it is possible to directly send the facsimile data received by the receiving unit 210. If the destination terminal device 300 is a mobile phone, the transfer processing unit 240 determines a JPEG file as the transfer data. Or, in the case where the destination terminal device 300 is a mobile phone, based on prior setting, the transfer processing unit 240 determines a JPEG file and a text data obtained by character recognition of image data decoded by the decoding unit 220 as the transfer data.

Figure 6:
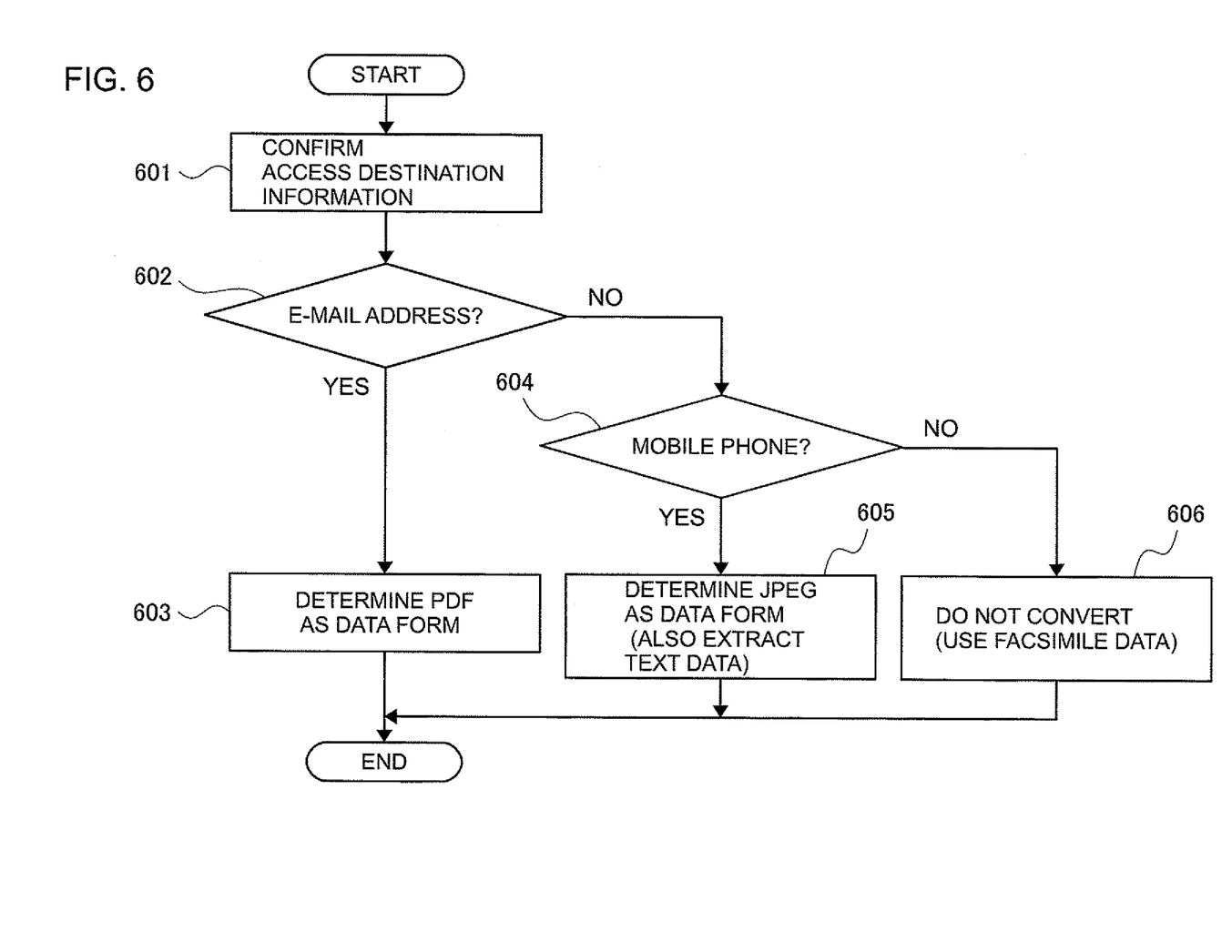
FIG. 6 is a flowchart showing an example of conversion control of data to be transferred by a transfer processing unit based on access destination information.

FIG. 6 is a flowchart showing a specific example of conversion control of the transfer data by a transfer processing unit 240 based on access destination information.

In the specific example shown in FIG. 6, first, the transfer processing unit 240 confirms the access destination information of the destination terminal device 300 specified as the destination with reference to setting information as shown in FIG. 3 (step 601). In the case where the access destination information is an e-mail address (Yes in step 602), the transfer processing unit 240 determines a PDF file as the data form of the transfer data (step 604).

In the case where the access destination information is a phone number of a mobile phone (No in step 602 and Yes in step 604), the transfer processing unit 240 determines a JPEG file as the data form of the transfer data (step 605). At this time, it may also be determined that text data generated by the character recognition process is sent together with the transfer data.

In the case where the access destination information is a phone number of a phone other than the mobile phone (No in step 602 and No in step 604), the transfer processing unit 240 determines the facsimile data encoded and compressed by the MH method or the MMR method as the transfer data without converting the data form thereof (step 606).

After determining the data form of the transfer data, which is under the control using the applicable data form table as shown in FIG. 5 or under the control described with reference to FIG. 6, the transfer processing unit 240 causes the data conversion unit 250 to convert the transfer data. Moreover, in the case where it is determined in step 605 that the text data is to be generated, the transfer processing unit 240 causes the character recognition unit 260 to generate the text data based on the character recognition process. Then, the transfer processing unit 240 controls the sending unit 270 so as to send the converted transfer data to the destination specified based on setting information as shown in FIG. 2 or FIG. 3. It should be noted that, in the case where the text data is generated when the transfer data is converted into a JPEG file, the transfer processing unit 240 causes the sending unit 270 to send the generated text data together with the converted JPEG file. Moreover, in the case where the destination terminal device 300 is a facsimile device, the transfer processing unit 240 causes the sending unit 270 to send the facsimile data.

<Sending Transfer Data>

In the case where the transfer data has been converted into a PDF file (the access destination information of the destination terminal device 300 is an e-mail address), the sending unit 270 sends the PDF file of the transfer data as an attachment of an e-mail to the e-mail address of the access destination information having been set. Moreover, in the case where the transfer data has been converted into a JPEG file (the access destination information of the destination terminal device 300 is a phone number of a mobile phone), the sending unit 270 sends the image (JPEG file) by MMS (Multimedia Messaging Service). In the case where text data is extracted, the text data can be sent with the JPEG file as a message of MMS. Further, in the case where the transfer data is the facsimile data (the access destination information of the destination terminal device 300 is a phone number of a telephone other than a mobile phone), the sending unit 270 sends the image (facsimile data) by facsimile transmission.

In the exemplary embodiment, the relay device 200 transfers the data received from the sending facsimile device 100 to a specific destination terminal device 300. As described above, as the destination terminal device 300, various kinds of information processing devices, such as personal computers, personal digital assistants, mobile phones and facsimile devices, are used. Here, in some cases, it is bothersome for a user of the destination terminal device 300 to view all the received images one by one. For example, in a personal digital assistant or mobile phone, since the image is displayed in a small-sized screen, there is a possibility that it is difficult to recognize the contents of the image. Moreover, there are also some cases where a mobile phone has a processor of insufficiently low performance or has a too small memory to process a large amount of images. Accordingly, when an image is to be transferred to the destination terminal device 300, the relay device 200 may transfer the first page only, and then transfer the rest of the pages in a case where a request to do so is received from the destination terminal device 300.

In this case, for example, by use of a table or the like, it may be possible to set, for each of the destination terminal devices 300, whether the above-described divisional transfer, in which the first page and the rest of the pages are divided for transfer, is performed or not. Further, in accordance with the converted data form, it may be possible to perform the divisional transfer in the case where the transfer data is converted into a JPEG file or a PDF file. Still further, it may also be possible to perform transfer of all data in a case where the data size of the transfer data is less than a certain value, and to perform the divisional transfer in a case where the data size of the transfer data is equal to or more than the certain value, regardless of the kind of the destination terminal device 300.

<Protection of Transfer Data>

In the above description, in the case where a PDF file is attached to an e-mail and sent, there is no guarantee that the transfer data arrives at the destination terminal device 300 due to the specification of the e-mail system in the Internet. Consequently, protection of the transfer data so as not to be lost may be carried out.

As a specific example of protection measures of the transfer data, it is considered that, in the case of transferring the data received from the sending facsimile device 100, the received image is outputted by the output unit 230 of the relay device 200. By printing and outputting the image onto a sheet which is a print medium, it becomes possible to confirm the received contents in case of losing the data.

Moreover, a storage area of the received data may be provided in a storage device (a memory, a magnetic disk device or the like) set in the relay device 200 to store the received data. In other words, when the data received from the sending facsimile device 100 is to be transferred to the destination terminal device 300, the transfer processing unit 240 stores the received data or the data decoded by the decoding unit 220 in the storage area of the storage device. In this case, for example, in the storage area, individual areas capable of providing access control based on authentication information (private areas) may be set corresponding to respective destination terminal devices 300, and the received data may be stored in the individual area corresponding to the destination terminal device 300 specified as the destination. Moreover, it may also be possible to select whether or not the received data (or the decoded data) is stored depending on the destination terminal device 300. For example, the data storage may be limited to the case where the transfer data is sent via an e-mail, or the data may be stored except for the case where the transfer is carried out by facsimile transmission (the case where the destination terminal device 300 is a facsimile device).

It should be noted that, since the memory capacity of the storage area is limited, in the case where the received data is stored in the storage area, it is necessary to delete the stored received data with appropriate timing. Specifically, the data may be deleted manually by the user of the relay device 200, or, after being stored in the storage area, the data may be automatically deleted after a lapse of an appropriate time (a week, a month or the like). Moreover, in a case where data of equal to or more than a constant amount has been accumulated in the storage area, the data may be automatically deleted in chronological order in which the data is stored. Further, in a case where the received data is stored in a volatile memory, the stored data is automatically deleted when the relay device 200 is turned off.

Moreover, as another example of protection measures of the transfer data, it is considered that the transfer data is sent to the destination terminal device 300 and is also stored in a file server provided on a network. In other words, in the case where the data received from the sending facsimile device 100 is to be transferred to the destination terminal device 300, the transfer processing unit 240 stores the received data or the data decoded by the decoding unit 220 in a file server on a network instead of the above-described memory device of the relay device 200. In this case, the data may be stored in the file server, not only in a data form corresponding to the kind of the destination terminal device 300 specified as the destination (namely, the data form same as the transfer data after conversion), but also in plural data forms. By doing so, when the transfer data is obtained from the file server, it becomes possible to obtain the data by use of various kinds of destination terminal devices 300.

The measures against the loss of the transfer data as described above become effective by being made in initial settings. However, there is a case where it is preferred that settings for printing and outputting the transfer data or storing the transfer data in the storage device are canceled for avoiding consumption of sheets in printing and outputting or increase of work required for disposing unnecessary data due to spreading of data. Accordingly, in a case where cancellation of these settings is made available, caution by the user may be urged by issuing a warning.

Figure 7:
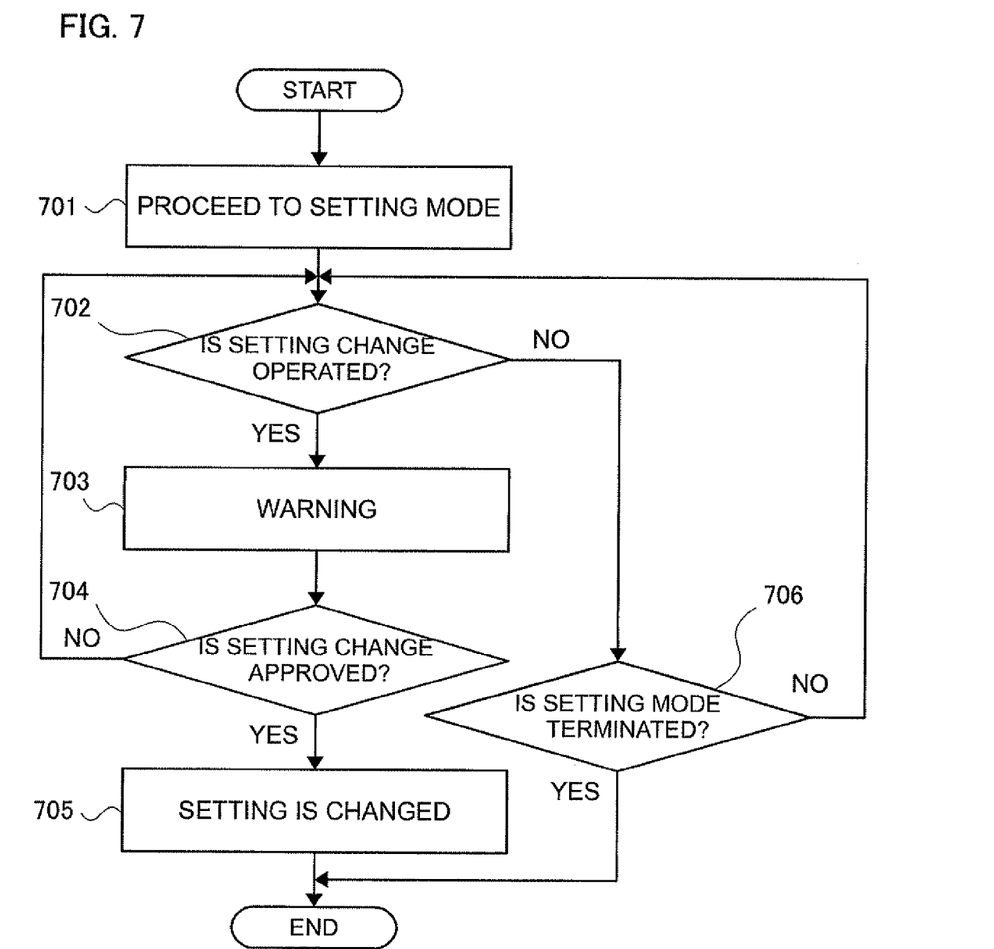
FIG. 7 is a flowchart showing a flow of operations of the relay device when setting is changed.

FIG. 7 is a flowchart showing a flow of operations when setting of the relay device 200 is changed.

Here, it is assumed that, in the initial settings, setting is made so that an image based on the transfer data is printed and outputted in the case where the transfer data is to be transferred via an e-mail. It should be noted that, in the case where the data is to be transferred, operation setting for performing printing and outputting based on the transfer data is regarded as first operation setting, whereas operation setting for not performing printing and outputting based on the transfer data is regarded as second operation setting. As shown in FIG. 7, the process proceeds to a setting mode, which is an operating mode capable of performing setting operation in the relay device 200 (step 701), then, when an operation for changing the operation setting for transfer from the first operation setting as the above-described initial settings to the second operation setting is performed (Yes in step 702), the relay device 200 issues a warning to urge a setting person to exercise caution (step 703). The warning is issued by, for example, displaying a message on a display device provided in the relay device 200 or performing audio output of a voice message or an alert.

Then, when an operation for approving the change in setting is performed after the above-described warning is issued (Yes in step 704), the relay device 200 changes the setting based on the operation (step 705), and operations in the setting mode are terminated. If an operation for cancelling the change of setting is performed (No in step 704), the relay device 200 returns to an initial state of the operation mode. Termination conditions of the setting mode are satisfied, operations in the setting mode are terminated (step 702 and step 706). As the termination conditions of the setting mode, for example, a case where an operation for terminating the setting mode is received, and a case where a predetermined waiting time is elapsed are assumed are provided.

<Modification of Exemplary Embodiment>

As a modification of a configuration for storing the transfer data in the file server on a network, it may be possible to send information about a place of storing the transfer data in the file server (URL (Uniform Resource Locator) or the like) only to the destination terminal device 300, without sending the transfer data. In this case, if necessary, the destination terminal device 300 issues a request for sending the data to the file server, to thereby obtain the data. Moreover, for example, the information about the place of storing the transfer data may be sent instead of the transfer data only to a specific destination terminal device 300, such as a mobile phone with a CPU of poor processing ability or a memory of less capacity or a personal digital assistant with a small-sized display screen.

Similarly, also in the configuration for storing the transfer data in the storage device of the relay device 200, it may be possible to notify the specific destination terminal device 300, such as a mobile phone or a personal digital assistant, that the relay device 200 stores the transfer data, without transferring the transfer data. In this case, the destination terminal device 300 that received the notification makes an inquiry to the relay device 200 as necessary, to thereby make a request for sending the transfer data.

Further, in the configuration for storing the transfer data in the storage device of the relay device 200 or in the file server on the network, the transferring function of the relay device 200 may be suspended during a specific time period. Also in the configuration for printing and outputting the received data by the output unit 230, similarly, the transferring function of the relay device 200 may be suspended during a specific time period.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing device comprising:
   a receiving unit that receives data;
   a transfer processing unit that (i) specifies a destination of the data received by the receiving unit, (ii) determines a type of an information processing device of the specified destination, and (iii) determines a data form of the data to be transferred to the information processing device in accordance with the determined type of the information processing device of the specified destination;

a data conversion unit that converts the data received by the receiving unit into the data form determined by the transfer processing unit; and a sending unit that sends, via a circuit capable of connecting to the information processing device of the specified destination, the data converted by the data conversion unit to the information processing device.

2. The data processing device according to claim 1, wherein the data received by the receiving unit is data that has been sent by facsimile transmission.

3. The data processing device according to claim 1, wherein, based on access destination information used for data connection with the information processing device specified as the destination, the transfer processing unit determines the data form of the data to be sent to the information processing device.

4. The data processing device according to claim 1, wherein the transfer processing unit refers to correspondence information that indicates correspondence between an information processing device to be a destination and a data form, and determines a data form corresponding to the information processing device of the specified destination as the data form of the data to be transferred to the information processing device.

5. The data processing device according to claim 1, further comprising:

a character recognition unit that performs a character recognition process on the data received by the receiving unit to generate text data, wherein, in a case where the information processing device of the destination is a device of a specific kind, the transfer processing unit causes the character recognition unit to generate the text data, and the sending unit sends the text data generated by the character recognition unit with the data converted by the data conversion unit.

6. The data processing device according to claim 1, further comprising:

a character recognition unit that performs a character recognition process on the data received by the receiving unit to generate text data, wherein, in a case where the data form determined as the data form of the data to be transferred is a specific data form, the transfer processing unit causes the character recognition unit to generate the text data, and the sending unit sends the text data generated by the character recognition unit with the data converted by the data conversion unit.

7. The data processing device according to claim 1, wherein the transfer processing unit specifies a sending device, which is a sending source of the data received by the receiving unit, based on sender identifying information obtained with the received data, and specifies the destination of the received data based on correspondence information indicating correspondence between a device that may possibly be the sending device and a destination of the received data.

8. The data processing device according to claim 1, wherein, when the data received by the receiving unit is transferred to the information processing device, the transfer processing unit further stores the received data in a predetermined storage device.

9. The data processing device according to claim 1, further comprising:

an output unit that forms an image on a medium based on the data received by the receiving unit and outputs thereof, wherein, at least in a case where the data received by the receiving unit is to be transferred to the information processing device, first operation setting for performing an output by the output unit based on the data and second operation setting for not performing the output by the output unit are provided, and when operation setting is changed from the first operation setting to the second operation setting, a warning is issued to a setting person.

10. A non-transitory computer readable medium storing a program that causes a computer to execute a process for controlling a relay device that receives data and transfers the data to an information processing device, the process comprising:

specifying a destination of the received data when the data is received;

determining a type of an information processing device of the specified destination;

determining a data form of the data to be transferred to the information processing device in accordance with the determined type of the information processing device of the specified destination;

converting the received data into the determined data form; and sending, via a circuit capable of connecting to the information processing device of the specified destination, the converted data to the information processing device.

11. The non-transitory computer readable medium according to claim 10, wherein, based on access destination information used for data connection with the information processing device specified as the destination, the data form of the data to be sent to the information processing device is determined.

12. The non-transitory computer readable medium according to claim 10, the process further comprising:

performing a character recognition process on the received data to generate text data, wherein, in a case where the information processing device of the destination is a device of a specific kind, the character recognition process is performed and the text data is generated, and the generated text data is sent with the converted data.

13. The non-transitory computer readable medium according to claim 10, the process further comprising:

performing a character recognition process on the received data to generate text data, wherein, in a case where the data form determined as the data form of the data to be transferred is a specific data form, the character recognition process is performed and the text data is generated, and the generated text data is sent with the converted data.

* * * * *